United States Patent
Allgaier et al.

(10) Patent No.: US 10,890,547 B2
(45) Date of Patent: Jan. 12, 2021

(54) METHOD FOR DETERMINING A SWITCHING STATUS OF AN IMPEDANCE SENSOR AND IMPEDANCE SENSOR

(71) Applicant: VEGA GRIESHABER KG, Wolfach (DE)

(72) Inventors: Volker Allgaier, Haslach (DE); Dominik Fehrenbach, Rottweil (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 16/519,223

(22) Filed: Jul. 23, 2019

(65) Prior Publication Data
US 2020/0033278 A1 Jan. 30, 2020

(30) Foreign Application Priority Data
Jul. 30, 2018 (EP) .................................... 18186363

(51) Int. Cl.
*G01N 27/02* (2006.01)
*G01R 27/26* (2006.01)

(52) U.S. Cl.
CPC .................................. *G01N 27/023* (2013.01)

(58) Field of Classification Search
CPC ... G01N 27/023; G01F 23/265; G01F 23/266; G01F 23/268; G01F 23/284
See application file for complete search history.

(56) References Cited

U.S. PATENT DOCUMENTS

2019/0265093 A1* 8/2019 Weinzierle ............ G01F 23/266

FOREIGN PATENT DOCUMENTS

| DE | 10 2009 060742 A1 | 7/2011 |
| EP | 3 118 591 A1 | 1/2017 |
| EP | 3 153 829 A1 | 4/2017 |
| EP | 3 312 571 A1 | 4/2018 |

OTHER PUBLICATIONS

EPO search report for related European application 18186363.0 dated Jan. 29, 2019.

* cited by examiner

*Primary Examiner* — Minh N Tang
(74) *Attorney, Agent, or Firm* — William Gray Mitchell

(57) ABSTRACT

A method for determining a switching status of an impedance sensor comprising a measuring probe, which can be influenced in its capacity by a medium surrounding the measuring probe, a measuring oscillator circuit in which the measuring probe is arranged as a capacity-determining element, an electronic unit with a signal generator to excite the measuring oscillator circuit, and a signal detector to determine a response signal of the measuring oscillator circuit, and an evaluation and control unit which is connected to the electronic unit, with the signal generator being addressed with an input signal, the response signal of the measuring oscillator circuit being determined, a switching status being issued based on the output value, and a plurality of amplitude minima of the frequency response being determined, whereby in the event that precisely one minimum is determined, here the minimum being issued as the output value.

10 Claims, 5 Drawing Sheets

METHOD FOR DETERMINING A SWITCHING STATUS OF AN IMPEDANCE SENSOR AND IMPEDANCE SENSOR

CROSS REFERENCE TO RELATED APPLICATIONS

This patent application claims priority to European Patent Application 18 186 363.0, filed on Jul. 30, 2018.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a method for determining a switching status of an impedance sensor and an impedance sensor.

Background of the Invention

The device of FIG. 1 shows a simplified cross-section with switching blocks of an impedance sensor 100 according to prior art. The impedance sensor 100 according to prior art comprises essentially an electronic unit 101 and a measuring sensor 102. The measuring sensor 102 is formed in the present exemplary embodiment as a serial oscillator circuit, hereinafter also called measuring oscillator circuit. A measuring capacity 110 forms between a measuring electrode 106 and a reference electrode 108, which is connected with a discrete inductivity 109 to the measuring oscillator circuit formed as a serial oscillator circuit.

If the impedance sensor is surrounded by a medium, said medium acts upon the measuring capacity as a dielectric and alters its capacity, which in turn modifies the measuring oscillator circuit and thus shifts its resonance frequency and also the signal amplitude of the response signal in the area of the resonance frequency.

The measuring electrode 106 is formed in a rotary-symmetric fashion in reference to a longitudinal axis L of the impedance sensor 100 and separated by isolation 107 from a process chamber 90. In the present impedance sensor 100 the reference electrode 108 is also embodied in a rotary-symmetrical fashion in reference to the longitudinal axis L. The reference electrode 108 is for this purpose embodied as a tube in the present exemplary embodiment, which simultaneously forms a part of a sensor housing. The measuring electrode 106 is arranged upstream the tube, seen in the direction of the longitudinal axis L, and surrounded by the isolation 107 arranged at the tube. The isolation 107 forms simultaneously a front-side cover of the housing.

Advantageously, the discrete inductivity 109 is selected such that a resonance frequency fres of the oscillator circuit adjusts for most different media and/or covering statuses (empty, full, and soiled) from 100 MHz to 200 MHz. A value of a complex-value impedance |Z| changing over the frequency of said measuring oscillator circuit is advantageously analyzed between 100 MHz and 200 MHz, i.e. the measuring oscillator circuit is excited via a frequency generator 103 with a frequency sweep using frequencies from 100 MHz to 200 MHz and a response signal (frequency response) of the measuring oscillator circuit is detected with a frequency detector 104. If a medium is present in the proximity of the measuring probe 102, the impedance behavior of the measuring oscillator circuit changes, i.e. particularly its resonance frequency fres shifts, at which a minimum of the impedance Z forms.

A frequency sweep is here understood as a sequential excitation with a plurality of successive frequencies within a frequency range, with the frequency range ideally covering all potential resonance frequencies of the measuring oscillator circuit. The generation of the oscillator frequency occurs with a voltage-controlled oscillator (VCO), which is controlled via a digital-analog converter (DAC) of a microcontroller. Over a period of 100 ms, for example, the frequency range shall be swept from 100 MHz to 200 MHz.

The alteration of the impedance Z of the measuring oscillator circuit is used for evaluation in an assessment and control unit 105. Concretely, the frequency response is evaluated regarding a frequency change $\Delta f$ and an alteration of the amplitude of a minimum of the impedance Z, also called amplitude change, and therefrom a switch command is generated. Alternatively, the evaluation may also occur at a maximum of the impedance Z.

FIGS. 2A and 2B show the position of the minimum 304 of the amplitude of the impedance Z for known impedance sensors 100, as described in FIG. 1, at various coverage conditions and media. The abscissa of the coordinate system shows the frequency f, the ordinate shows the amplitude of the impedance Z of the received response signal. The frequency is shown from 0% to 100% of the excitation frequency f from 100 MHz to 200 MHz. The amplitude is also standardized to the amplitude of the excitation signal from 0% to 100%.

The location of the minima of the response signal is shown, i.e. the position of the resonance point at a coverage of the probe with ketchup, water, or spinesso, a clear probe exposed to air, or when ketchup adheres to the probe. The knowledge of these minima of the response signal, depending on the medium to be detected, allows to divide the measuring range of the impedance sensor into three sections (covered, uncovered, adherence) and provided with the switching thresholds shown in FIG. 2B.

Interfering signals, for example electromagnetic irradiation by pumps or motors, which are operating in the proximity of the impedance sensor, result in prior art repeatedly to faulty switching, since both the frequency as well as the amplitude of the impedance curve cannot be correctly determined any more, particularly near the minimum.

An exemplary, undisturbed response signal 301 is shown in FIG. 3A.

An output signal of the voltage-controlled oscillator (VCO) is applied upon the oscillator circuit of the impedance limit switch, which reacts in the undisturbed state to the impedance behavior shown in FIG. 3A. At the resonance point of the impedance limit switch 100, precisely one minimum 304 is yielded in the undisturbed resonance curve 301. From this response signal an unambiguous minimum can be determined with a frequency and amplitude that can be allocated. If this response signal is interfered by electromagnetic disturbances, here a distorted response signal 302 develops, as shown in FIG. 3B. This distorted response signal of FIG. 3B shows a plurality of minima and maxima at various frequencies f, which respectively represent different amplitude values. From this signal, the position of the actual minimum cannot be reliably detected anymore, so that in prior art faulty switching may occur due to electromagnetic disturbances.

This is the foundation for the present invention.

The objective of the present invention is to provide a method for determining a switching status of an impedance sensor, particularly a limit switch based on an impedance determination, which reliably issues a correct measurement and/or switching status in spite of electromagnetic disturbances. Further, an objective of the present invention is to provide a limit sensor implementing this method.

These objectives are attained in a method showing the features of claim 1 as well as a limit sensor with the features of claim 6. Advantageous variants are the objective of the dependent claims.

BRIEF SUMMARY OF THE INVENTION

In a preferred embodiment, A method for determining a switching status of an impedance sensor (100) comprising
a measuring probe (102), which can be influenced in its capacity by a medium surrounding the measuring probe (102),
a measuring oscillator circuit, in which the measuring probe (102) is arranged as a capacity-determining element,
an electronic unit (101) with a signal generator (103) to excite the measuring oscillator circuit and a signal detector (104) to determine a response signal of the measuring oscillator circuit, and
an evaluation and control unit (105) connected to the electronic unit (101) with the following steps:
addressing the signal generator (103) with an input signal,
determining the response signal of the measuring oscillator circuit,
issuing a switching status based on the output value,
characterized in that the steps:
determining a plurality of amplitude minima of the frequency response,
in the event that precisely one minimum (304) is determined, issuing the minimum as the output value,
in the event that more than one minimum is detected, sequentially addressing the signal generator (103) with a plurality of input signals,
determining the response signals of the measuring oscillator circuit, and
forming an average from the response signals
determining and issuing the minimum of the average as the output value.

In another preferred embodiment, the method as described herein, characterized in that the plurality of input signals includes at least 5, preferably at least 10 input signals.

In another preferred embodiment, the method as described herein, characterized in that the plurality of input signals includes at least two different input signals.

In another preferred embodiment, the method as described herein, characterized in that the input signals differ in their signal period and their frequency strokes are identical.

In another preferred embodiment, the method as described herein, characterized in that frequency sweeps are performed with a start sequence from 100 MHz to an end sequence of 200 MHz, with the frequency sweeps preferably showing 10 different sweep periods from 8 ms to 17 ms with respectively a difference of one ms each.

In another preferred embodiment, the method as described herein, characterized in that the frequency sweeps are processed with increasing sweeping periods.

In another preferred embodiment, the method as described herein, characterized in that the frequency sweeps are processed with an arbitrary sequence of the sweeping periods.

In an alternate preferred embodiment, a limit switch comprising a measuring probe (102) that can be influenced in its capacity by a medium (304) surrounding the measuring probe (102),
comprising a measuring oscillator circuit, in which the measuring probe (102) is arranged as a capacity-determining element,
an electronic unit (101) with a signal generator (103) for exciting the measuring oscillator circuit and a signal detector (104) to determine a response signal of the measuring oscillator circuit, and
an evaluation and control unit (105), connected to the electronic unit (101), characterized in that the limit switch is embodied to implement the method according to any of the previous claims.

In another preferred embodiment, the limit switch as described herein, characterized in that the evaluation and control unit (105) comprises a unit for clutch averaging.

In another preferred embodiment, the limit switch as described herein, characterized in that the evaluation and control unit (105) is embodied in a suitable fashion to excite the frequency generator (103) with a plurality of different input signals.

DETAILED DESCRIPTION OF THE INVENTION

Figure 1:
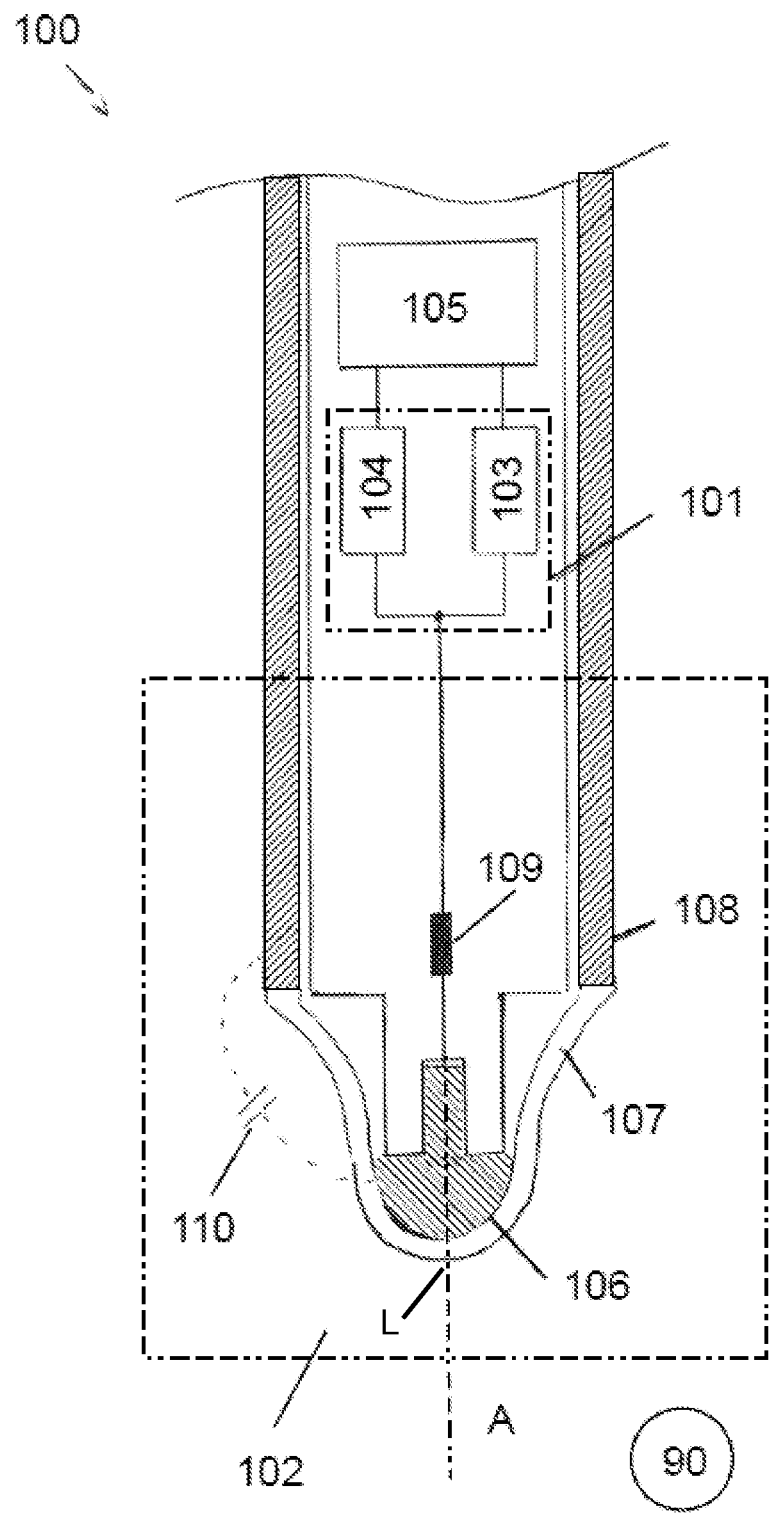
FIG. 1 is a line drawing evidencing an impedance sensor according to prior art (already discussed).
Figure 2A:
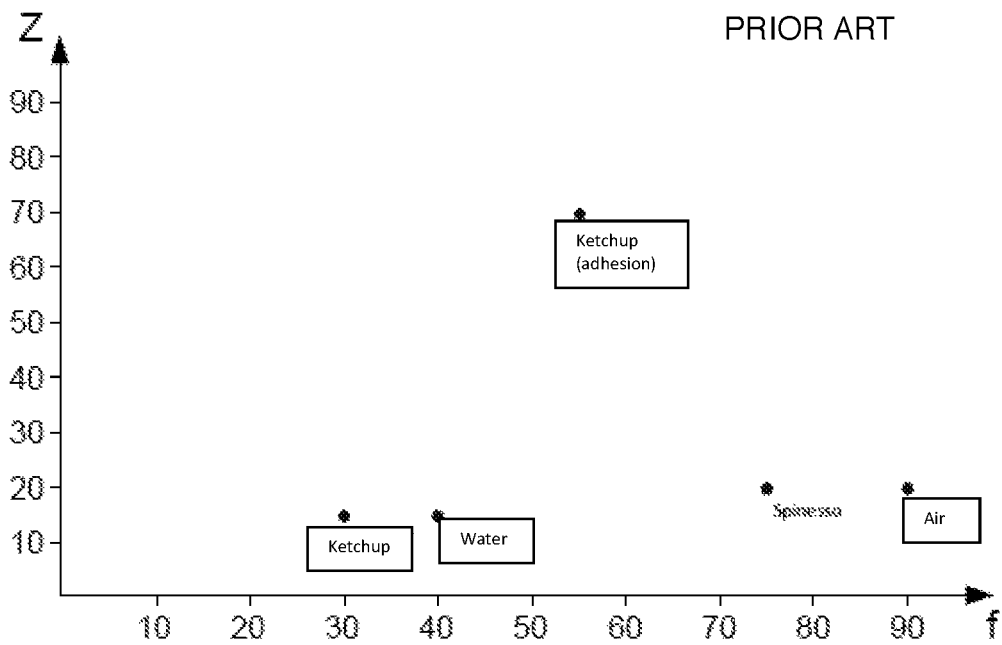
FIGS. 2A and 2B are line drawings evidencing the position of the minima in the response signal of an impedance sensor for different coverage conditions and media (already discussed).
Figure 2B:
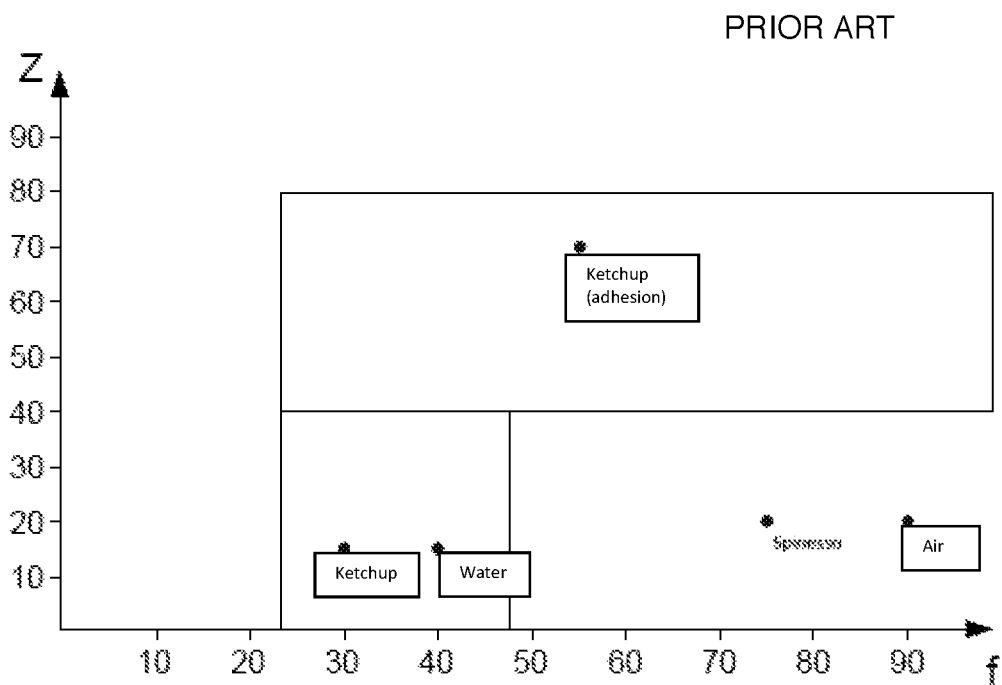

A method according to the invention for determining a switching status of an impedance sensor comprising a measuring probe, which can be influenced in its capacity by a medium surrounding the measuring probe, a measuring oscillator circuit in which the measuring probe is arranged as an element determining capacity, an electronic unit with a signal generator for exciting the measuring oscillator circuit, and a signal detector for determining an response signal of the measuring oscillator circuit, and an evaluation and control unit, which is connected to the electronic unit, shows the following steps:

At first, the signal generator is addressed with an input signal, which then emits a frequency ramp, a so-called frequency sweep, to the measuring oscillator circuit.

Then the response signal of the measuring oscillator circuit is determined and a switching status is issued based on the output value, with the output value being determined as follows.

The method according to the invention is characterized in that a plurality of amplitude minima of the frequency response is determined and in the event that precisely one minimum is detected, this minimum is issued as the output value to determine the switching status. In the event that more than one minimum is detected, the signal generator is sequentially addressed with a plurality of input signals. By the sequential addressing of the signal generator with a plurality of input signals the measuring oscillator circuit sequentially reacts with response signals upon the frequency sweeps generated by the signal generator.

The response signals of the measuring oscillator circuit are determined in another step and an average is formed from the response signals in a subsequent step.

Then the minimum of the average is determined and issued as the output value.

The average can be determined by clutch averaging, for example.

In an advantageous embodiment of the method the signal generator is excited with a plurality of input signals, which comprise at least 5, preferably at least 10 input signals. This way clutch averaging can be performed over at least 5, preferably at least 10 response signals such that the signal-to-noise ratio is appropriately improved.

If the measuring oscillator circuit is excited with several identical signals, it can occur in case of periodic interferences that all response signals are disturbed in an identical fashion, and thus no improvement of the signal-to-noise ratio occurs. However, when the plurality of the input signals comprises at least two different input signals, it can be achieved that periodic interferences are reflected differently in the response signal such that by averaging the response signals here an improvement of the signal-to-noise ratio can be achieved.

A simple option to alter the input signals is given when the input signals are different in their signal duration and identical in their frequency stroke. This way, differently inclined frequency ramps of the frequency sweeps are generated, resulting in periodic disturbances that are different in their response signal of the measuring oscillator circuit.

For common impedance limit sensors, it may therefore be beneficial when the frequency sweeps are performed from an initial frequency of 100 MHz to an end frequency of 200 MHz, with here the frequency sweeps preferably showing 10 different sweeping periods from 8 ms to 17 ms with a difference each of preferably one ms. This way the resonance frequency is respectively obtained at a different point of time in the frequency sweep and thus differently interfered by disturbances, so that a good reconstruction of the undisturbed response signal is possible.

The frequency sweeps may be processed for example with increasing sweeping periods. An arbitrary sequence is here advantageous in that from one clutch averaging to another one the measurements yielded are not the result of the same excitation signal. Constant interfering signals can this way be better suppressed.

A limit switch according to the invention comprising a measuring probe that can be influenced in its capacity by a medium surrounding the measuring probe, a measuring oscillator circuit in which the measuring probe is arranged as a capacity determining element, an electronic unit with a signal generator for exciting the measuring oscillator circuit, and a signal detector for determining a response signal of the measuring oscillator circuit, and an evaluation and control unit, which is connected to the electronic unit, is characterized in that the limit switch is embodied to implement the method described above.

This can occur for example such that the evaluation and control unit shows a unit for clutch averaging.

Additionally, the evaluation and control unit may be embodied in a manner such that it is suitable to excite the frequency generator with a plurality of different input signals so that periodic disturbances are reflected differently in the response signals of the measuring oscillator circuit.

The output value can be obtained by determining a minimum. The minimum can be obtained for example by forming the first derivation and equating to zero or by numeric approaches.

DETAILED DESCRIPTION OF THE FIGURES

The design of the impedance sensor 100 according to the present invention is essentially consistent with the design known from prior art and described in the context with FIG. 1. The design of the measuring probe 102 is equivalent to the one known from prior art and here, deviating from the illustration shown in FIG. 1, allowing to select for an impedance sensor 100 any other suitable design of a measuring probe 102.

Figure 3A:
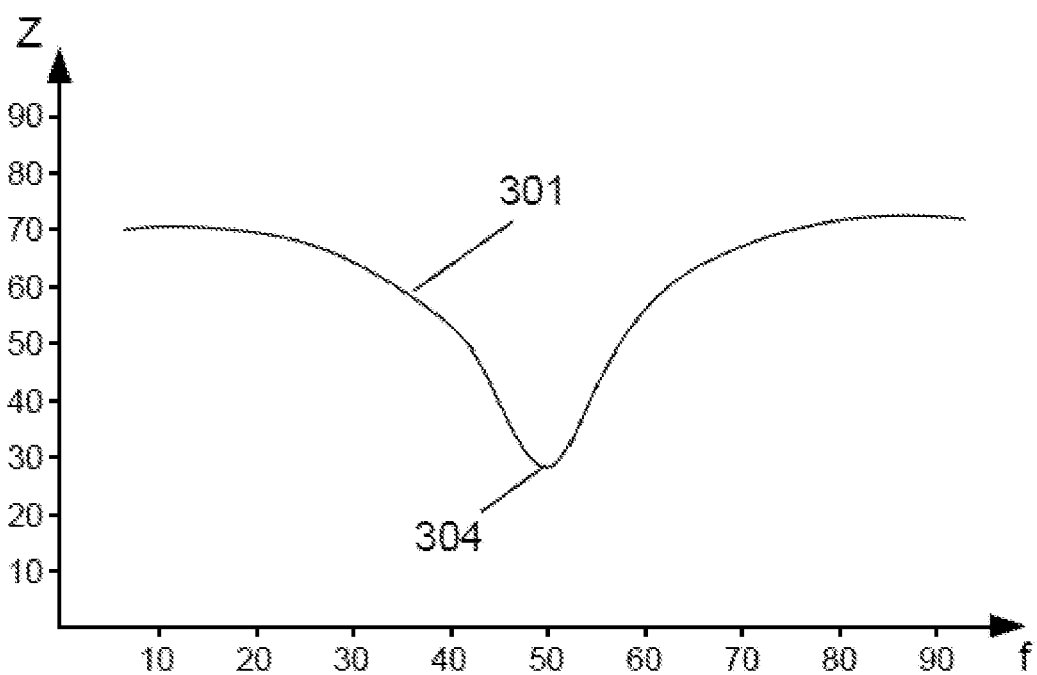
FIGS. 3A and 3B are line drawings evidencing an undisturbed and an interfered response signal of the impedance sensor according to FIG. 1 (already discussed).
Figure 3B:
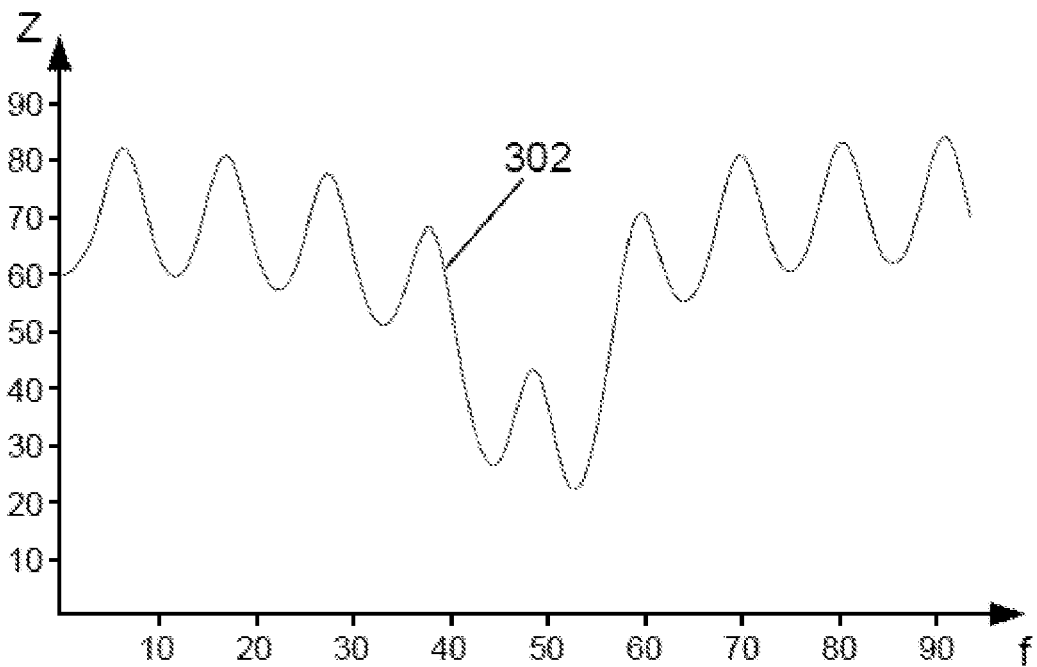

The method for determining a switching status of an impedance sensor 100 is characterized in that in the event that an interfered response signal 302 is received, as shown in FIG. 3B, it is detected that the interfered response signal 302 shows a plurality of minima. With this acknowledgment the measuring oscillator circuit of the impedance sensor 100 is sequentially impinged with a plurality of frequency sweeps, in the present exemplary embodiment with 10 frequency sweeps. The individual frequency sweeps show each a frequency stroke of 100 MHz and run through a frequency range from 100 MHz to 200 MHz, however they differ from each other in the duration of these frequency sweeps. This leads to the individual frequency sweeps being distinguished in their incline of the frequency ramps processed.

Figure 4A:
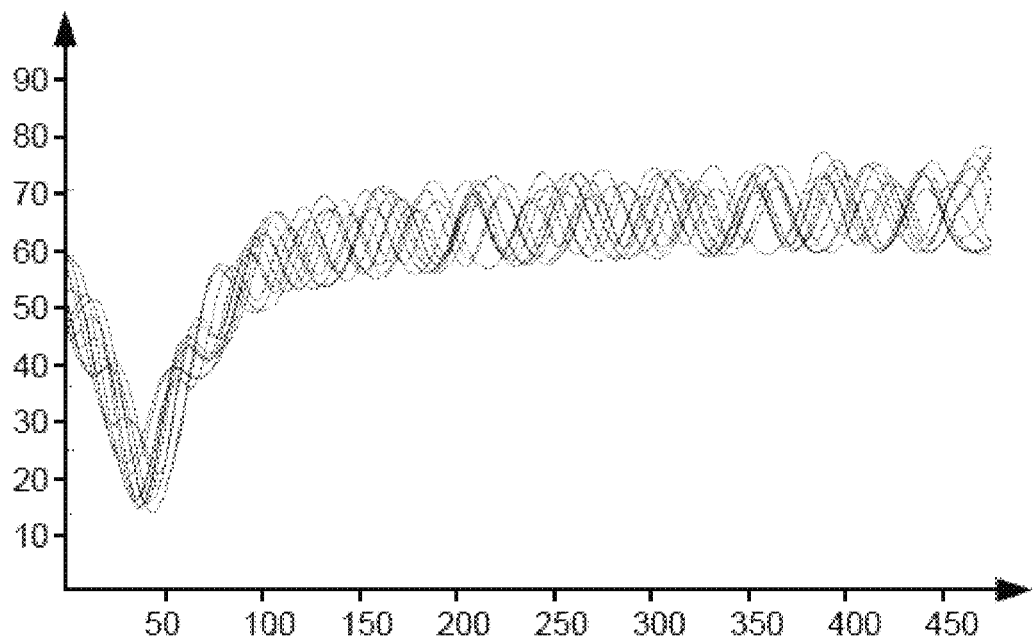
FIG. 4A is a line drawing evidencing are line drawings evidencing a graphic illustration of the process to determine the actual, undisturbed response signal.

The response signals to such an excitation of the measuring oscillator circuit are shown in FIG. 4A.

Figure 4B:
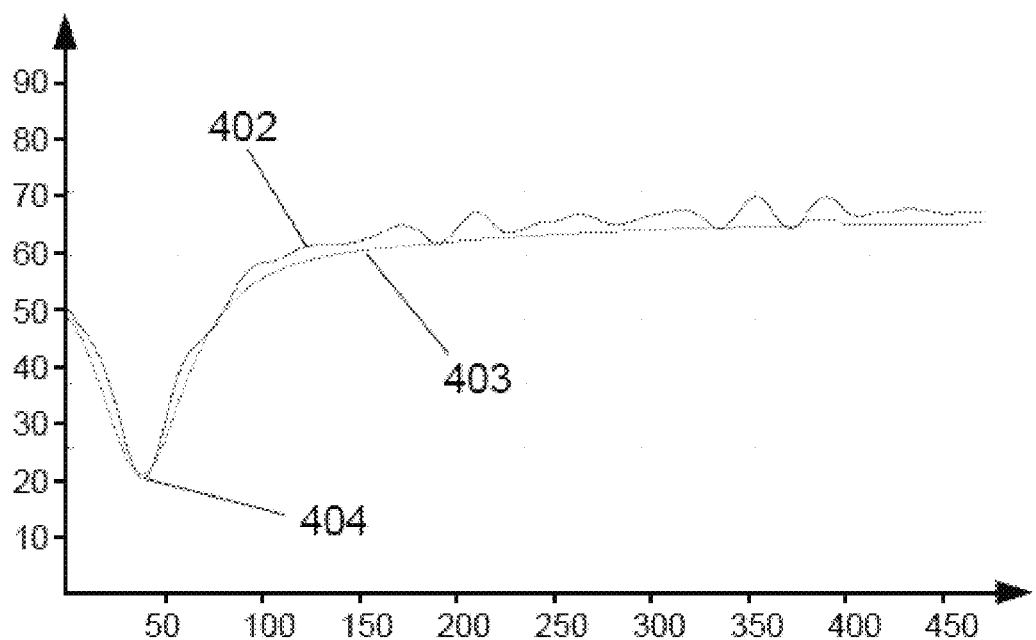
FIG. 4B is a line drawing evidencing a comparison of the curve determined with the method of the present application and the undisturbed response signal.

Based on this clutch of response signals, all of which being interfered by disturbing signals, averages are formed over the individual response signals and thus the average signal 402 is yielded shown in FIG. 4B. For comparison purposes, FIG. 4B also shows the undisturbed response signal 403. As discernible from FIG. 4B, the average signal 402 deviates only very little from the undisturbed response signal, particularly in the proximity of the minimum 404.

Experiments have shown that the present method allows already after 4 frequency sweeps and a respective number of response signal to determine the minimum of the undisturbed response signal with a precision of +/−2%. Starting at 16 frequency sweeps, a precision of +/−0.5% is yielded, which is sufficient for all common applications, so that another increase of the number of frequency sweeps is usually not beneficial.

Figure 5:
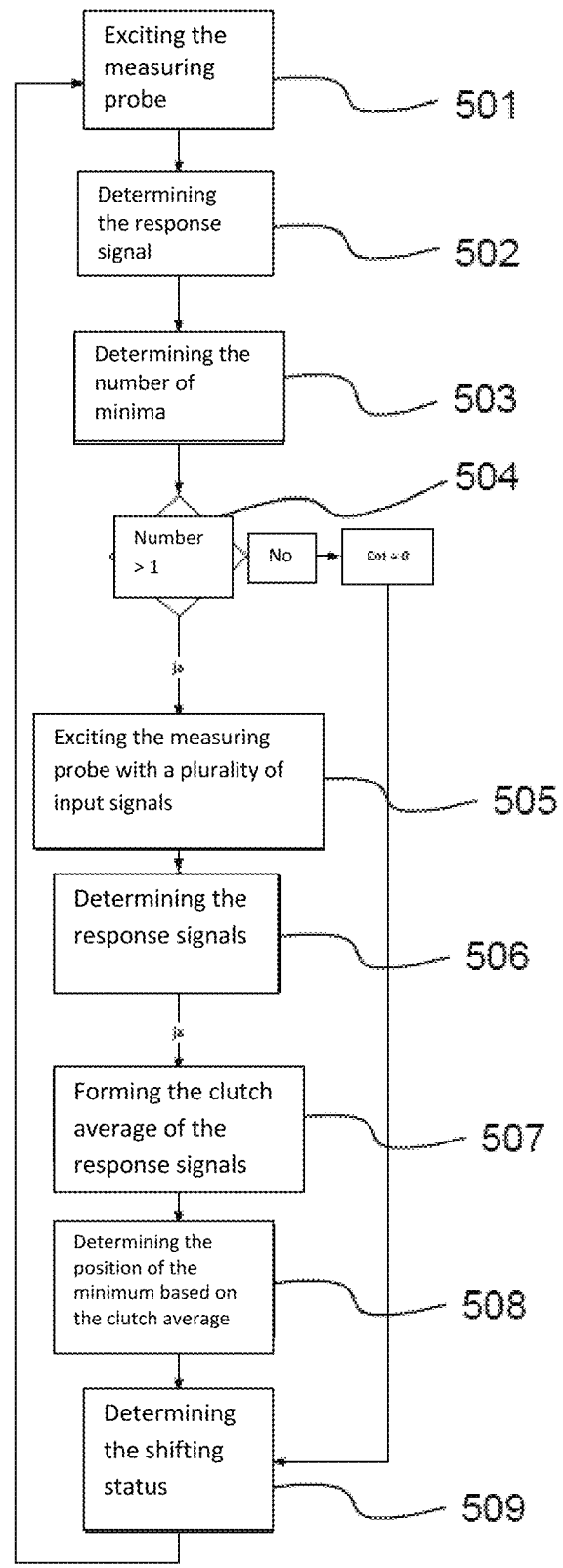
FIG. 5 is a line drawing evidencing a flowchart of the method for determining the shifting status according to the present invention.

FIG. 5 shows a flowchart of an exemplary method to determine a switching status of an impedance sensor 100 according to the present invention.

In a first step 501 a measuring probe 102 of the impedance sensor 100 is excited. This occurs with a frequency sweep in a frequency range in which the resonance frequency fres of the impedance sensor 100 is expected. In the present exemplary embodiment the resonance frequency fres of the impedance sensor 100 is expected, due to the sizing of the components in the measuring oscillator circuit, in a range from 100 MHz to 200 MHz. The measuring probe 102 of the impedance sensor 100 is here excited with a frequency sweep from 100 MHz to 200 MH.

In a second step 502 a response signal of the measuring probe 102 is determined. The response signal is determined regarding its impedance z in reference to the frequency f of the excitation signal.

In a third step 503 a plurality of minima contained in the response signal is determined.

In the event that in a fourth step 504 it is determined that precisely one minimum is contained in the response signal, the position of said minimum is used to determine the switching status of the impedance sensor 100 in a ninth step 409. In the event that in a fourth step 504 however a plurality of minima is determined which are greater than "1", the measuring probe 102 is sequentially excited in a fifth step 505 with a plurality of input signals.

The sequential excitation of the measuring probe 102 with a plurality of input signals occurs in the present exemplary embodiment of the method such that the measuring probe 102 is excited with ten frequency sweeps with a start frequency of 100 MHz and an end frequency of 200 MHz, with the individual frequency sweeps respectively showing different sweeping periods. The frequency sweeps are performed with a sweeping period of 7-16 ms and a gradation of respectively 1 ms.

After each excitation of the measuring probe 102 with a frequency sweep, a response signal of the measuring probe 102 is determined in a sixth step 506, with the response signals being temporarily saved.

Subsequently in a seventh step 507 an average is formed over the ten response signals received. From this average, in an eight step 508 the minimum is determined and based on the position of said minimum in a ninth step 509 the switching status of the impedance sensor 100 is determined.

At this point it shall be noted that the number of ten excitation signals is mentioned here only as an example and any number of excitation signals and corresponding response signals can be selected, by which a sufficient precision of the approach to the undisturbed response signal is yielded to perform the present method.

LIST OF REFERENCE NUMBERS 100 impedance sensor
101 electronic unit
102 measuring probe
103 frequency generator/signal generator
104 frequency detector/signal detector
105 evaluation and control unit
106 measuring electronic
107 isolation
108 reference electrode
109 inductivity
110 measuring capacity
301 undisturbed response signal
302 interfered response signal
304 minimum
402 average
403 undisturbed response signal
404 minimum
501-509 processing steps
f frequency
fres resonance frequency
Z impedance/amplitude The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A method for determining a switching status of an impedance sensor comprising the steps:
   determining a plurality of amplitude minima of a frequency response,
   in the event that precisely one minimum is determined, issuing such one minimum as an output value,
   in the event that more than one minimum is detected, sequentially addressing a signal generator with a plurality of input signals,
   determining response signals of a measuring oscillator circuit,
   forming an average from the response signals, and
   determining and issuing the minimum of the average as the output value,
   wherein the impedance sensor comprises:
   a measuring probe, which is influenced in such measuring probe's capacity by a medium surrounding the measuring probe,
   the measuring oscillator circuit, in which the measuring probe is arranged as a capacity-determining element,
   an electronic unit with a signal generator to excite the measuring oscillator circuit and a signal detector to determine a response signal of the measuring oscillator circuit, and
   an evaluation and control unit connected to the electronic unit with the following steps:
   addressing the signal generator with an input signal,
   determining the response signal of the measuring oscillator circuit, and
   issuing a switching status based on the output value.

2. The method of claim 1, wherein the plurality of input signals includes at least 5 to 10 input signals.

3. The method of claim 1, wherein the plurality of input signals includes at least two different input signals.

4. The method of claim 1, wherein the input signals differ in their signal period and their frequency strokes are identical.

5. The method of claim 1, wherein frequency sweeps are performed with a start sequence from 100 MHz to an end sequence of 200 MHz, with the frequency sweeps showing 10 different sweep periods from 8 ms to 17 ms with respectively a difference of one ms each.

6. The method according to claim 5, wherein the frequency sweeps are processed with increasing sweeping periods.

7. The method according to claim 5, wherein the frequency sweeps are processed with an arbitrary sequence of the sweeping periods.

8. A limit switch comprising a measuring probe that is influenced in such measuring probe's capacity by a medium surrounding the measuring probe, further comprising a measuring oscillator circuit, in which the measuring probe is arranged as a capacity-determining element, an electronic unit with a signal generator for exciting the measuring oscillator circuit and a signal detector to determine a response signal of the measuring oscillator circuit, and an evaluation and control unit, connected to the electronic unit, wherein the limit switch is embodied to implement the method of claim 1.

9. The limit switch according to claim 8, wherein the evaluation and control unit comprises a unit for clutch averaging.

10. The limit switch of claim 8, wherein the evaluation and control unit is embodied in a suitable fashion to excite a frequency generator with a plurality of different input signals.

\* \* \* \* \*